US012431565B2

United States Patent
Ju et al.

(10) Patent No.: US 12,431,565 B2
(45) Date of Patent: Sep. 30, 2025

(54) LITHIUM-ION BATTERY MODULE AND APPLICATION THEREOF

(71) Applicant: Hefei Gotion High-Tech Power Energy Co., Ltd., Hefei (CN)

(72) Inventors: Linrun Ju, Hefei (CN); Jiayu Zhou, Hefei (CN); Jiankang Chen, Hefei (CN); Yongkuan Shen, Hefei (CN); Xinfeng Li, Hefei (CN); Xingwu Xu, Hefei (CN); Fang Lu, Hefei (CN)

(73) Assignee: HEFEI GOTION HIGH-TECH POWER ENERGY CO., LTD., Hefei (CN)

( * ) Notice: Subject to any disclaimer, the term of this patent is extended or adjusted under 35 U.S.C. 154(b) by 564 days.

(21) Appl. No.: 17/801,236

(22) PCT Filed: Jun. 9, 2021

(86) PCT No.: PCT/CN2021/099050
§ 371 (c)(1),
(2) Date: Aug. 19, 2022

(87) PCT Pub. No.: WO2021/249416
PCT Pub. Date: Dec. 16, 2021

(65) Prior Publication Data
US 2023/0035867 A1 Feb. 2, 2023

(30) Foreign Application Priority Data

Jun. 10, 2020 (CN) .......................... 202010522158.0

(51) Int. Cl.
*H01M 50/178* (2021.01)
*H01M 10/0525* (2010.01)
(Continued)

(52) U.S. Cl.
CPC ..... *H01M 50/178* (2021.01); *H01M 10/0525* (2013.01); *H01M 50/509* (2021.01); *H01M 50/538* (2021.01); *H01M 50/591* (2021.01)

(58) Field of Classification Search
CPC .......................... H01M 50/178; H01M 50/591
See application file for complete search history.

(56) References Cited

U.S. PATENT DOCUMENTS

| | | | |
|---|---|---|---|
| 2017/0040575 A1* | 2/2017 | Bang | ................... H01M 50/184 |
| 2019/0027795 A1 | 1/2019 | Schoenherr | |

FOREIGN PATENT DOCUMENTS

| | | |
|---|---|---|
| CN | 105244460 A | 1/2016 |
| CN | 205122649 U | 3/2016 |

(Continued)

OTHER PUBLICATIONS

CN105244460 English translation. Pan et al. China. Jan. 13, 2016. (Year: 2016).*

(Continued)

*Primary Examiner* — Christopher P Domone
(74) *Attorney, Agent, or Firm* — LOZA & LOZA, LLP; Michael Fedrick

(57) ABSTRACT

The disclosure provides a lithium ion battery module which includes: a plurality of cores, being winded cores, laminated cores or pouch batteries, one end of each core being provided with a positive tab and a negative tab, the plurality of cores being connected in series and/or in parallel by using positive tabs and negative tabs through connecting sheets, the positive tabs and negative tabs forming a total positive electrode; a plurality of partition members, each partition member being used for accommodating a single core and physically separating respective cores, the partition members having a top opened structure; and a housing and a cover plate, configured to form an inner space after being assembled for accommodating partition members and cores, (Continued)

the cover plate being provided with a connecting part for a total module positive electrode and a connecting part for a total module negative electrode.

20 Claims, 7 Drawing Sheets

(51) Int. Cl.
*H01M 50/509* (2021.01)
*H01M 50/538* (2021.01)
*H01M 50/591* (2021.01)

(56) References Cited

FOREIGN PATENT DOCUMENTS

| | | |
|---|---|---|
| CN | 207338447 U | 5/2018 |
| CN | 108550734 A | 9/2018 |
| CN | 109860468 A | 6/2019 |
| CN | 209133557 U | 7/2019 |
| CN | 110718666 A | 1/2020 |
| CN | 212517324 U | 2/2021 |

OTHER PUBLICATIONS

International Search Report for corresponding International Patent Application No. PCT/CN2021/099050, dated Sep. 7, 2021.
Extended European Search Report issued on May 20, 2025 for counterpart European Patent Application No. 21822322.0, 7 pages.

* cited by examiner

LITHIUM-ION BATTERY MODULE AND APPLICATION THEREOF

CROSS-REFERENCE TO RELATED APPLICATIONS

This application is the U.S. national stage of International Patent Application No. PCT/CN2021/099050, filed on Jun. 9, 2021 and entitled LITHIUM-ION BATTERY MODULE AND APPLICATION THEREOF, which claims the benefit of priority under 35 U.S.C. § 119 from Chinese Patent Application No. 202010522158.0, filed on Jun. 10, 2020. The disclosures of the foregoing applications are incorporated herein by reference in their entirety.

TECHNICAL FIELD

The present disclosure relates to a lithium-ion battery module, and in particular to a lithium-ion battery module in which cores (winded cores, laminated cores or pouch batteries) are directly assembled into the module, belonging to the technical field of lithium-ion batteries.

BACKGROUND

With the development of the society, people pay more and more attention to environmental problems. A new energy vehicle technology is accepted by more and more consumers, and new energy vehicles will gradually replace traditional vehicles. As a demand for new energy vehicles increases year by year, it is particularly sensitive to the production efficiency, cost and energy density of batteries after grouping.

In current lithium-ion batteries, each electric core is typically packaged and encapsulated separately, and then several electric cores are assembled together to form a lithium-ion battery module. Such a structure has a complex assembly process, a low assembly efficiency, and a low energy density.

SUMMARY

The technical objective of the present disclosure is to provide a lithium-ion battery module, which has a relatively simple assembly process, a high assembly efficiency, a high energy density and low cost.

In order to achieve the above technical objective, the present disclosure provides a lithium-ion battery module, comprising:
 a plurality of cores, the core being a winded core, a laminated core or a pouch battery; one end of each core being provided with a positive tab and a negative tab respectively, the plurality of cores being connected in series and/or in parallel by using the positive tabs and the negative tabs through connecting sheets, and the positive tabs and the negative tabs forming a total module positive electrode and a total module negative electrode;
 a plurality of partition members, each partition member being used for accommodating a single core and physically separating the respective cores, and the partition member having a top (corresponding an end surface, which is provided with a positive tab and a negative tab, of the core) opened structure; and
 a housing and a cover plate, configured to be assembled to form an inner space for accommodating the plurality of partition members and the cores therein, and the cover plate being provided with a connecting part for the total module positive electrode and a connecting part for the total module negative electrode.

In some embodiments of the present disclosure, the connecting part for the total module positive electrode and the connecting part for the total module negative electrode that are provided on the cover plate may be metal connecting sheets, which contact the total module positive electrode and the total module negative electrode on the core respectively. In other embodiments of the present disclosure, the connecting part for the total module positive electrode and the connecting part for the total module negative electrode that are provided on the cover plate may also be openings in the cover plate, which are used to expose the total module positive electrode and the total module negative electrode on the core after the housing and cover plate are assembled and sealed.

In the lithium-ion battery module of the present disclosure, it is preferable that the partition member is an individual housing, a partition membrane or a partition plate, and preferably a partition plate. The individual housing may be an injection molded individual housing formed of PC, PP, or ABS. The partition membrane may be a hot melt sealed partition membrane formed of PET or PP.

In the lithium-ion battery module of the present disclosure, it is preferable that the lithium-ion battery module has 2 to 10 cores.

In the lithium-ion battery module of the present disclosure, it is preferable that a screw hole is provided in the connecting sheet between the positive tab and the negative tab of the core, a corresponding screw hole is provided in the cover plate, and the cover plate is fixed with the connecting sheet between the positive tab and the negative tab of the core by a bolt.

In the lithium-ion battery module of the present disclosure, it is preferable that the lithium-ion battery module further comprises a top cover that covers the cover plate and is provided with an outlet for the total module positive electrode and an outlet for the total module negative electrode.

In the lithium-ion battery module of the present disclosure, it is preferable that a seal is formed between the cover plate and the opened structure of each partition member, and the cover plate is provided with liquid injection holes for injecting liquid into the partition member. Herein the number of the liquid injection holes is the same as that of the cores.

In the lithium-ion battery module of the present disclosure, it is preferable that the cover plate has a plurality of connection holes for connecting external signal lines. At the same time, the connection hole can also be used to connect the cover plate with the positive tab and the negative tab.

In the lithium-ion battery module of the present disclosure, it is preferable that the lithium-ion battery module further comprises a heating sheet or a liquid cooling plate.

In the lithium-ion battery module of the present disclosure, it is preferable that a size of the lithium-ion battery module is half of a standard battery size.

The present disclosure further provides a lithium-ion battery, which is the lithium-ion battery module according to any one of the above disclosures, or which includes the lithium-ion battery modules according to one or more of the above disclosures.

The lithium-ion battery module of the present disclosure can be used as a single lithium-ion battery directly, or several lithium-ion battery modules of the present disclosure can be assembled and used as Li-ion batteries, or the lithium-ion battery module of the present disclosure can be connected with other modules and assembled as lithium-ion batteries. When a plurality of modules are included, the plurality of modules may be connected by buckle connection or bolt connection, for example, in a way that a hot melt nut is embedded in the cover plate for connection.

The lithium-ion battery module of the present disclosure has lithium-ion batteries with high specific energy, high safety reliability, wide temperature range, high energy density (200 Wh/kg), and long life. The lithium-ion battery module can not only be applied in the field of electric vehicles, but also widely used in electric bicycles, tricycles, UPS power supplies, automobile starting power supplies and 48V weak-hybrid or dual-voltage systems and the like.

The lithium-ion battery module of the present disclosure may be designed as a pluggable battery box having only half of the size of a lead-acid battery box, or designed as having the same size as a lead-acid batter, or having other sizes and shapes. The voltage capacity of the lithium-ion battery module of the present disclosure can be comparable to the standard lead-acid battery, which is generally 12V·20 Ah, but has a size (91 mm×76 mm×165 mm) which may be only half of that of the standard battery.

The lithium-ion battery module of the present disclosure directly assembles and envelops winded cores, so as to form a battery module from a core (a winded core, a laminated core or a pouch battery) (Jelly-roll) to a module (JTM process), and a new concept of direct core-to-module (JTM) is proposed, in which the core (a winded core, a laminated core or a pouch battery) is directly assembled into the module and the power battery of the system. The lithium-ion battery module of the present disclosure completes sealing, insulation, and separation of ion transmission channels at the core layers connected in series with each other, and has an external series structure to ensure the overall sealing performance.

The lithium-ion battery module of the present disclosure is connected in series/parallel at the core level, and is directly assembled into a module, thereby reducing the manufacturing cost and improving the space utilization rate.

The outer side of the lithium-ion battery module of the present disclosure is provided with module assembling components, and no additional fixing member needs to be added in the process from the module being assembled to the system, and only BMS and related wiring harness are added.

The energy density of the lithium-ion battery module of the present disclosure exceeds 190 Wh/kg, compared with the lithium battery module, the volume utilization rate is improved by more than 10%, and the impedance is reduced by about 10%, the manufacturing period is short, the cost is reduced by about 20%, and the cycle can reach 4000 cycles at a normal temperature.

BRIEF DESCRIPTION OF DRAWINGS

FIG. 5b is a structural schematic of a cross section taken along a line L of FIG. 5a.

Figure 1:
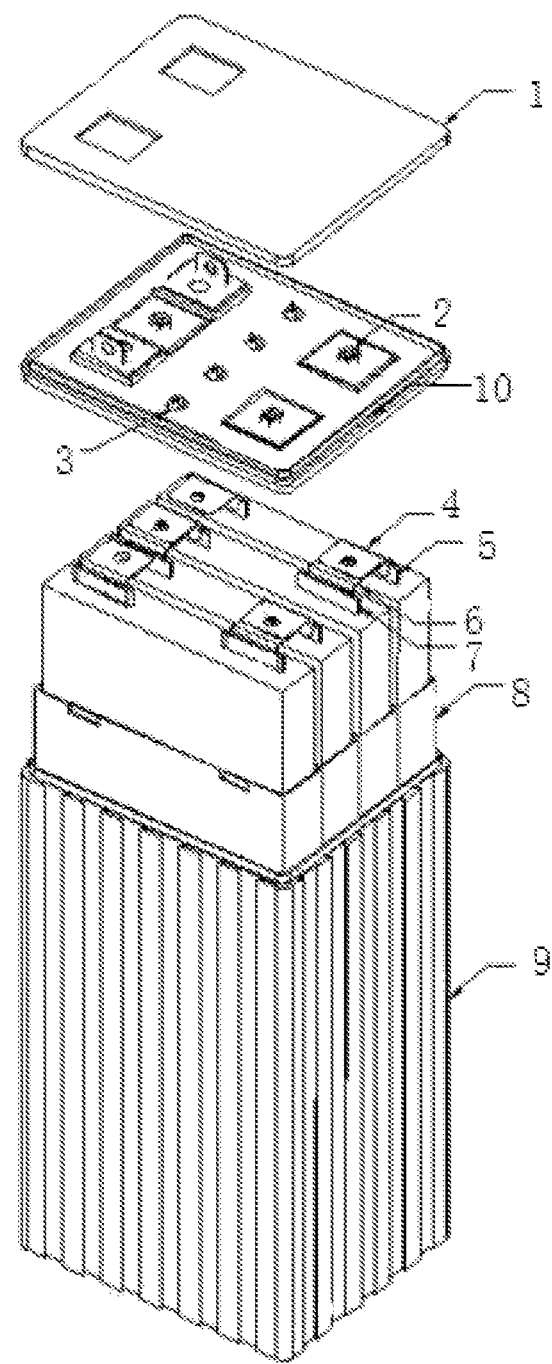
FIG. 1 is a structural schematic of a lithium-ion battery module according to an embodiment of the present disclosure.

Description of main reference numerals:
1. injection molding top cover; 2. connection hole; 3. liquid injection hole; 4. positive connecting sheet; 5. positive tab; 6. negative connecting sheet; 7. negative tab; 8. individual housing; 9. injection molding housing; 10. injection molding cover plate; 11. total module positive electrode; 12. total module negative electrode.

DESCRIPTION OF EMBODIMENTS

In order to have a clearer understanding of the technical features, objects and advantageous effects of the present disclosure, the following detailed description will now be made of technical solutions of the disclosure, which, however, should not be construed as limiting the scope to which the disclosure may be applied.

In a specific embodiment of the present disclosure, there is provided a lithium-ion battery module, comprising:
- a plurality of cores, the core being a winded core, a laminated core, or a pouch battery, one end of each core is provided with a positive tab 5 and a negative tab 7 respectively, the plurality of cores are connected in series and/or in parallel by using the positive tabs 5 and the negative tabs 7 through connecting sheets, and the positive tabs and the negative tabs form a total module positive electrode 11 and a total module negative electrode 12. The number of cores can be adjusted according to the actual voltage requirements;
- a plurality of individual housings 8 (partition members), each of which is used for accommodating a single core and physically separating the respective cores, and the individual housings 8 has a top opened structure;
- a conductive structure positive connecting sheet 4 for connecting a positive tab 5 of the core; and a conductive structure negative connecting sheet 6 for connecting a negative tab 7 of the core;
- an injection molding cover plate 10, which accommodates and fixes a structure of the core, is assembled with an injection molding housing to form an inner space for accommodating the plurality of individual housings 8 and the cores therein, wherein a seal is formed between the injection molding cover plate 10 and the top opened structure of the individual housing 8, and the injection molding cover plate 10 is provided with a connecting part for the total module positive electrode 11 and a connecting part for the total module negative electrode 12;

an injection molding housing 9, which serves as the outermost housing, plays a role of protection and support, and is used for accommodating a plurality of individual housings 8; an injection molding top cover 1 for covering the injection molding cover plate 10 and encapsulating the housing.

Figure 2A:
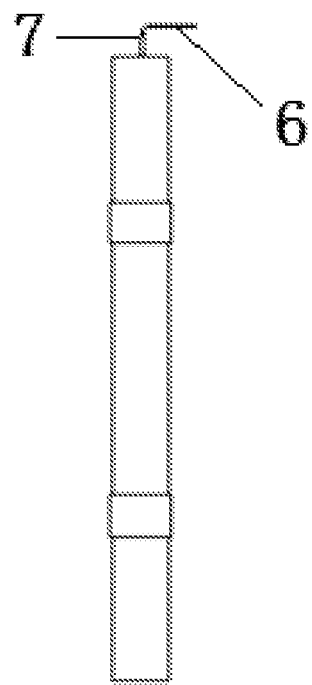
FIG. 2a is a side view structural schematic of a winded core of a lithium-ion battery module according to an embodiment of the present disclosure.
Figure 2B:
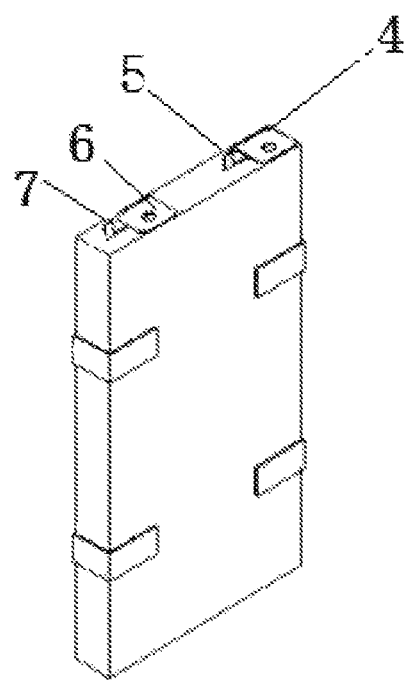
FIG. 2b is a 45° side-view structural schematic of a winded core of a lithium-ion battery module according to an embodiment of the present disclosure.

As shown in FIG. 1, 4 winded cores are included. The winded core is prepared by winding a plurality of small electric cores through a winded core process, and has a structure as shown in FIG. 2a and FIG. 2b. One end of the winded core is provided with a positive tab 5 and a negative tab 7, respectively. The positive tab 5 is connected via a positive connecting sheet 4 and the negative tab 7 is connected via a negative connecting sheet 6. The positive connecting sheet 4 and the negative connecting sheet 6 may be connected in series and/or in parallel. For example, a negative connecting sheet of the core is connected to a positive connecting sheet of an adjacent core, and a positive connecting sheet without connection and a negative connecting sheet without connection are used as a total module positive electrode connecting sheet and a total module negative electrode connecting sheet, respectively.

The positive connecting sheet 4 and the negative connecting sheet 6 may be connected by bolts, and connection openings may be provided on the positive connecting sheet 4 and the negative connecting sheet 6, respectively, for passing through bolts or nuts. Alternatively, the positive connecting sheet and the negative connecting sheet may also be connected by welding.

In another specific embodiment of the present disclosure, a winded core may be replaced with a laminated core or a pouch battery according to actual needs. The laminated core is prepared by using a plurality of small electric cores through a laminated core process.

As shown in FIG. 1, four winded cores are arranged in four individual housings 8 respectively, the individual housings 8 are used for physically separating the respective winded cores, and the four winded cores are arranged in separate spaces, to accomplish sealing, insulation, and separation of ion transmission channels at the core layers connected in series and/or in parallel with each other. The individual housing 8 may be a single plastic shell, which is not limited herein, and may be made of PET or PP hot-melt sealed film, PVC heat shrinkable film, or PC, PP or ABS injection molded structure.

Figure 3:
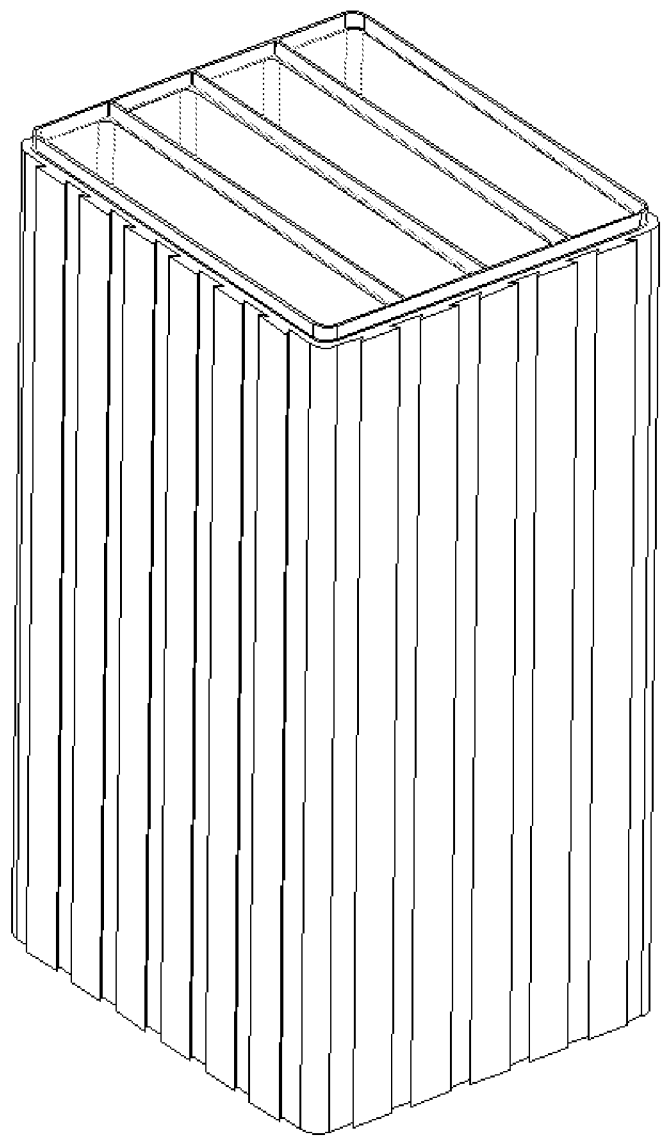
FIG. 3 is a schematic diagram of an integrally formed structure of partition plates of the lithium-ion battery module according to an embodiment of the present disclosure.

In another specific embodiment of the present disclosure, the partition plate may be an inserted plate that is inserted directly into the interior of the injection molding housing 9, dividing the internal cavity of the injection molding housing 9 into a plurality of cells; or the partition plate may be a structure formed by integrally molded with the injection molding housing 9, as shown in FIG. 3. When the partition member is a partition plate, no additional housing is needed to package the cores, and only one housing is required for the process from small electric cores to a module to complete the packaging, which greatly simplifies the process and cost.

As shown in FIG. 1, the lithium-ion battery module includes an injection molding cover plate 10. A seal is formed between the injection molding cover plate 10 and the top opened structure of the individual housing 8. The injection molding cover plate 10 is provided with a connection hole 2 for connecting an external signal line, and which can be used for sealing connection of the injection molding cover plate 10 with the positive connecting sheet 4 and the negative connecting sheet 6.

In a specific embodiment of the disclosure, the injection molding cover plate 10 is in the sealing connection with the positive connecting sheet 4 and the negative connecting sheet 6 at one end of the winded core. The injection molding cover plate 10 may be connected with the positive connecting sheet 4 and the negative connecting sheet 6 by bolt connection. For example, a bolt or a nut may pass through the connection hole 2, and the connection hole 2 is connected to the positive connecting sheet 4 and the negative connecting sheet 6, while the injection molding seal can be performed.

In addition, the injection molding cover plate 10 is matched with the injection molding housing 9 to form a seal, and ultrasonic hot melt welding or laser welding can be used to ensure sealing of the entire housing and sealing of individual cavities. The injection molding cover plate 10 is integrally injection-molded with the positive connecting sheet 4 and the negative connecting sheet 6 without subsequent assembly (the nuts in bolt connection are integrally injection-molded, while the fixing parts in the middle, such as positive and negative connecting sheets, signal lines and the like, are required to be added in the process of bolt connection, so that subsequent processing and assembly are required).

Figure 5A:
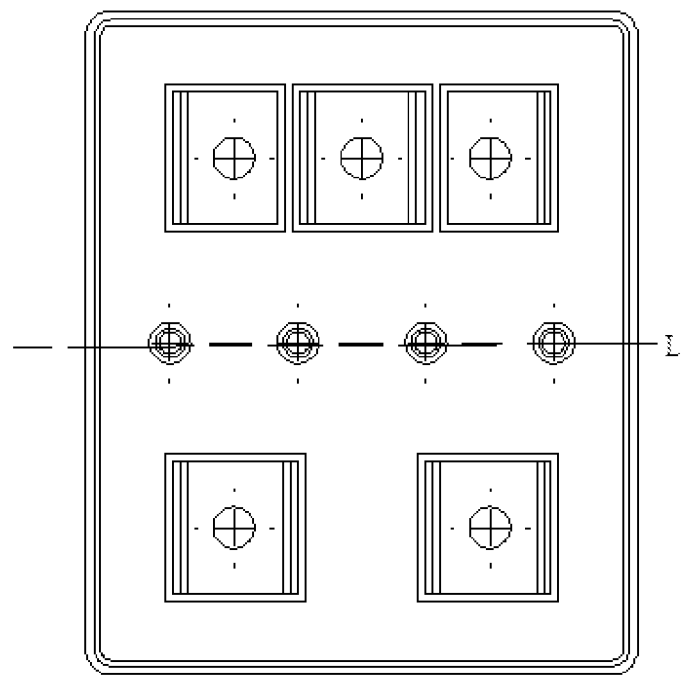
FIG. 5a is a top view structural schematic of an injection molding cover plate of a lithium-ion battery module according to an embodiment of the present disclosure.
Figure 5B:
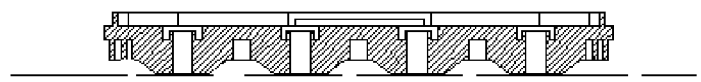

At the same time, the injection molding cover plate 10 is provided with liquid injection holes 3 for injecting liquid into the individual housing and exhausting gas. Electrolyte may be injected according to actual needs. The number of the liquid injection holes 3 is the same as that of the individual housings, so as to realize an individual control of the liquid injection hole and the corresponding individual housing 8. In addition, each of the liquid injection holes 3 is provided with a liquid injection hole sealing sheet for sealing the module. After the liquid injection hole is formed, it is sealed by the liquid injection hole sealing sheet, and the liquid injection hole sealing sheet is covered by the injection molding cover plate 10. When the gas pressure inside the battery is too high during use, the liquid injection hole sealing sheet will be popped open for exhausting the gas. Gas is exhausted through fine holes between the injection molding cover plates, and the liquid injection hole sealing sheet after exhausting can be restored to the original state. FIG. 5a shows a top view of the injection molding cover plate 10. FIG. 5b is a cross-sectional view of the liquid injection holes 3 in the middle line of the injection molding cover plate 10.

Figure 4:
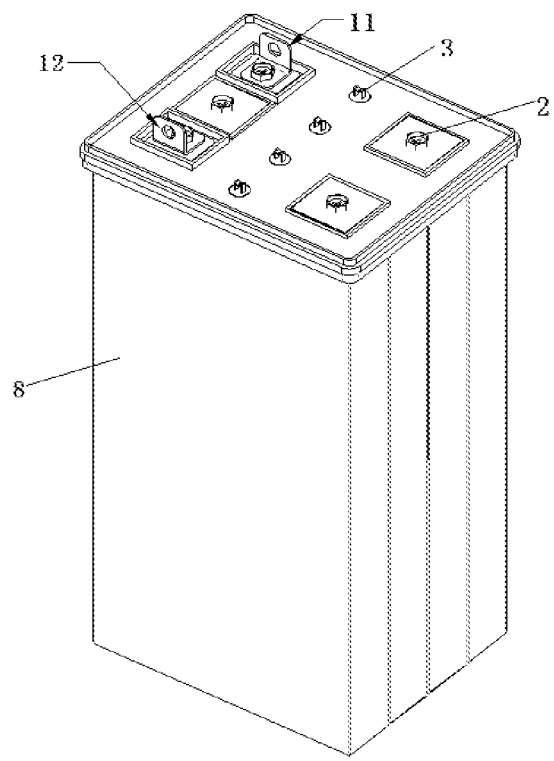
FIG. 4 is a front view structural schematic of a lithium-ion battery module according to an embodiment of the present disclosure.

As shown in FIG. 4, the injection molding cover plate 10 is provided with a connecting part for the total module positive electrode 11 and a connecting part for the total module negative electrode 12, as the positive and negative conductive structures of the overall module, for welding a positive lug and a negative lug respectively.

Figure 6:
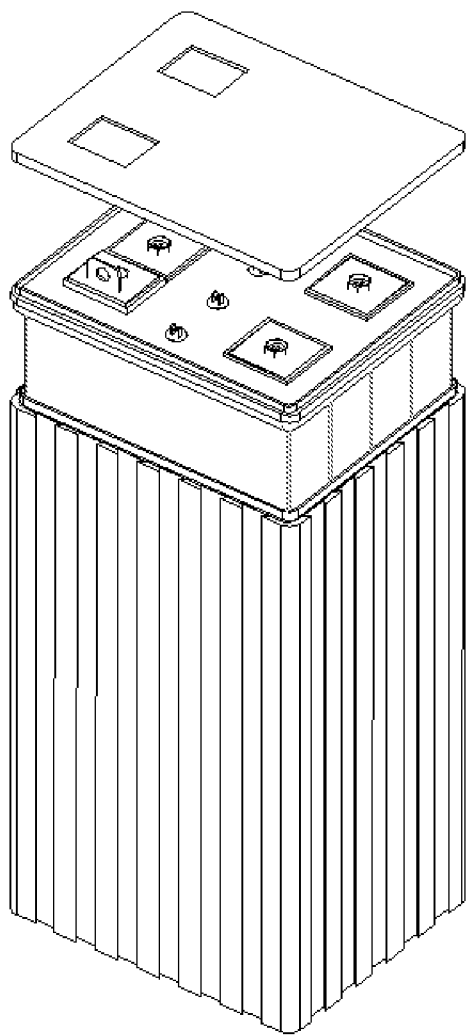
FIG. 6 is another structural schematic of a lithium-ion battery module according to an embodiment of the present disclosure.

As shown in FIG. 6, the lithium-ion battery module includes an injection molding housing 9 and an injection molding top cover 1. Herein, the injection molding housing 9 is used for accommodating a plurality of individual housings 8. The injection molding top cover 1 is used for covering the injection molding cover plate 10, and is provided with an outlet for the total module positive electrode 11 and an outlet for the total module negative electrode 12, and can also be used for encapsulating the injection molding housing 9. The injection molding top cover 1 and the injection molding housing 9 can be fixed and encapsulated by pouring glue to ensure a seal of the module.

In a specific embodiment of the present disclosure, the injection molding cover plate 10, the injection molding top cover 1 and the injection molding housing 9 are encapsulated by using a sealant, and they also may be sealed by ultrasonic hot melt welding or laser welding at the same time. A connector such as a connection hole 2 and a post are sealed with the sealant.

Figure 7:
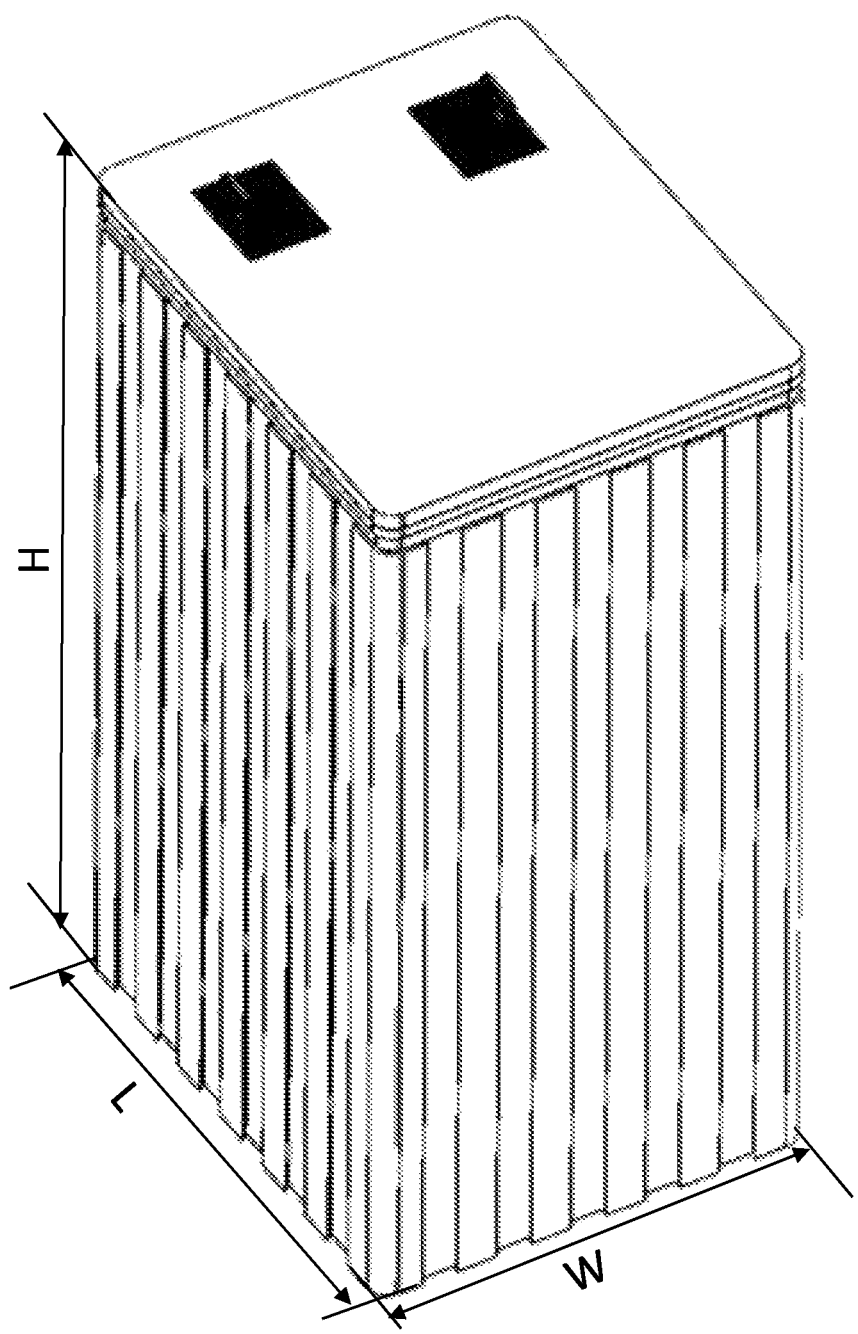
FIG. 7 is an appearance structural schematic of a lithium-ion battery module according to an embodiment of the present disclosure.

In a specific embodiment of the present disclosure, a module in the above embodiments is used directly as a lithium-ion battery, as shown in FIG. 7. In yet another specific embodiment of the present disclosure, two or more lithium-ion battery modules as shown in FIG. 7 may be assembled together to be used as lithium-ion batteries. Alternatively, one or more lithium-ion battery modules as shown in FIG. 7 may be assembled with other lithium-ion battery modules to be used as lithium-ion batteries.

In another specific embodiment of the present disclosure, according to actual needs, the lithium-ion battery module may further be provided with a heating plate and a liquid cooling plate. A greater efficiency can be achieved in cooperation with an outside designed module thermal management system. The heating plate and the liquid cooling plate can be arranged in the middle of each individual housing 8, or may also be placed at a lower part of the overall module, for the purpose of heating or heat dissipation respectively.

In another specific embodiment of the present disclosure, the heating sheet may be a metal sheet, graphene, or a PTC sheet. Due to the built-in heating sheet, the lithium-ion battery module can be used in an extremely low temperature environment, thereby overcoming the disadvantage that the lithium-ion batteries are difficult to be used in cold regions.

Figure 8:
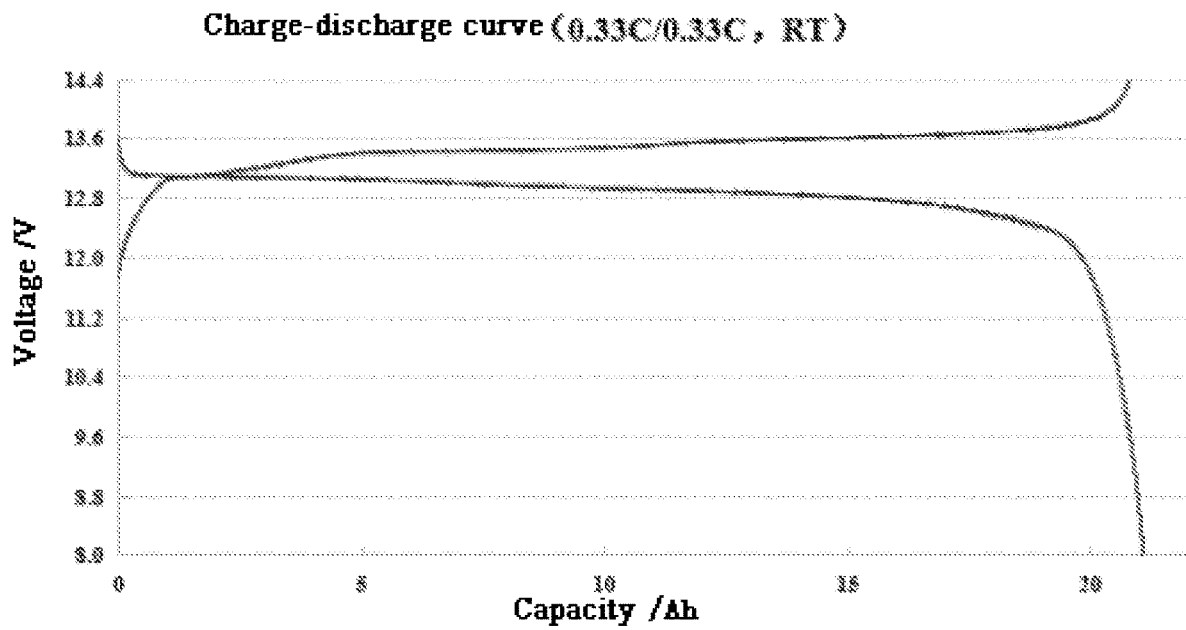
FIG. 8 is a charge-discharge performance curve of a lithium-ion battery module according to a specific embodiment of the present disclosure.
Figure 9:
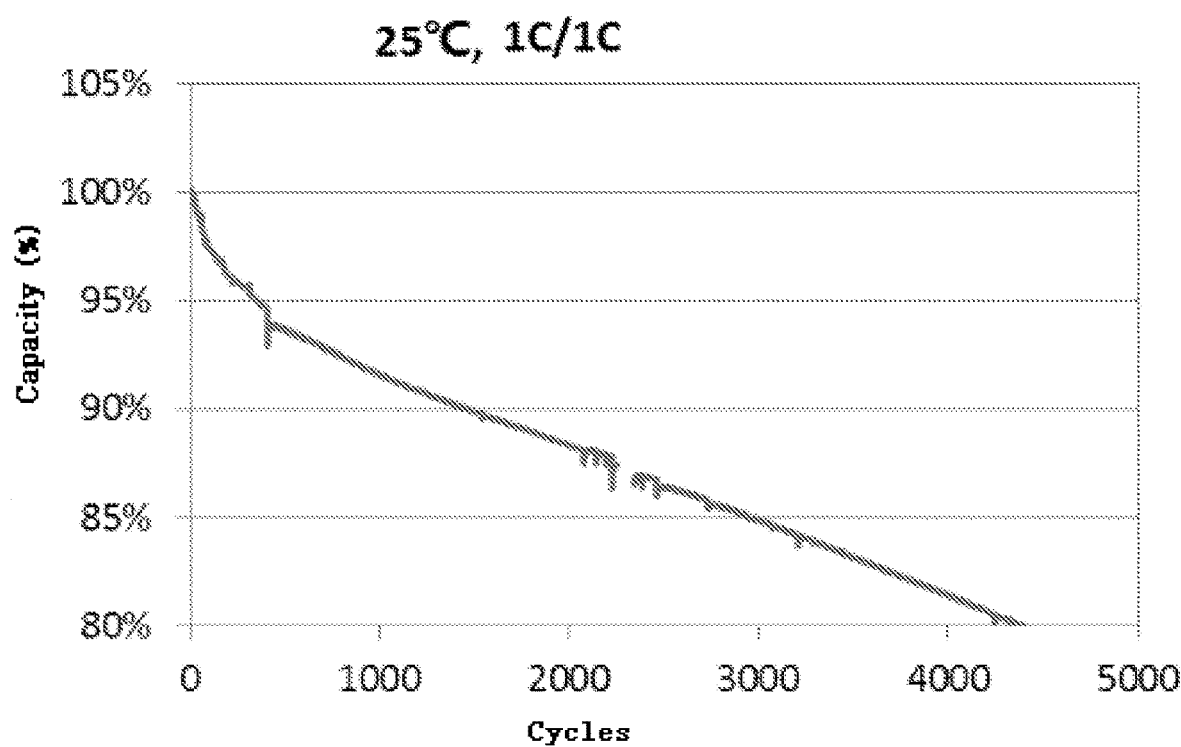
FIG. 9 is a cycle performance curve of a lithium-ion battery module according to a specific embodiment of the present disclosure.

The lithium-ion battery module as shown in FIG. 1 is tested. The charge-discharge curve is shown in FIG. 8, which shows that the capacity of 0.33 C can reach 21.1 Ah. The voltage range of the normal single electric core is 2.0 to 3.65, and in this embodiment, an electric core module generated in series is used, which can reach a voltage range of 8.0 to 14.4. FIG. 9 shows the cycling performance of the lithium-ion battery module shown in FIG. 1, the cycling performance of which can be up to 4000 cycles at 25° C.

The invention claimed is:

1. A lithium-ion battery module, comprising:
    a plurality of cores, each core being a winded core, a laminated core or a pouch battery, one end of each core being provided with a positive tab and a negative tab respectively, the plurality of cores being connected in series and/or in parallel by using the positive tabs and the negative tabs through connecting sheets, the positive tabs and the negative tabs forming a total module positive electrode and a total module negative electrode;
    a plurality of partition members, each partition member being used for accommodating a single core and physically separating the respective cores, the partition members each having a top opened structure; and
    a housing and a cover plate, configured to be assembled to form an inner space for accommodating the plurality of partition members and the cores therein, the cover plate being provided with a connecting part for the total module positive electrode and a connecting part for the total module negative electrode,
    wherein a screw hole is provided in the connecting sheet between the positive tab and the negative tab of the core, a corresponding screw hole is provided in the cover plate, and the cover plate is fixed with the connecting sheet between the positive tab and the negative tab of the core by a bolt.

2. The lithium-ion battery module according to claim 1, wherein the partition member is an individual housing, a partition membrane or a partition plate.

3. The lithium-ion battery module according to claim 1, wherein the lithium-ion battery module has 2 to 10 cores.

4. The lithium-ion battery module according to claim 1, further comprising a top cover that covers the cover plate and is provided with an outlet for the total module positive electrode and an outlet for the total module negative electrode.

5. The lithium-ion battery module according to claim 1, wherein a seal is formed between the cover plate and the opened structure of each partition member, and the cover plate is provided with liquid injection holes for injecting liquid into the partition member.

6. The lithium-ion battery module according to claim 5, wherein the number of the liquid injection holes is the same as the number of the cores.

7. The lithium-ion battery module according to claim 1, wherein the cover plate has a plurality of connection holes for connecting external signal lines.

8. The lithium-ion battery module according to claim 1, further comprising a heating sheet or a liquid cooling plate.

9. The lithium-ion battery module according to claim 1, wherein a size of the lithium-ion battery module is half of a standard battery size.

10. A lithium-ion battery, wherein the lithium-ion battery is a lithium-ion battery module, comprising:
    a plurality of cores, each core being a winded core, a laminated core or a pouch battery, one end of each core being provided with a positive tab and a negative tab respectively, the plurality of cores being connected in series and/or in parallel by using the positive tabs and the negative tabs through connecting sheets, the positive tabs and the negative tabs forming a total module positive electrode and a total module negative electrode;
    a plurality of partition members, each partition member being used for accommodating a single core and physically separating the respective cores, the partition members each having a top opened structure; and
    a housing and a cover plate, configured to be assembled to form an inner space for accommodating the plurality of partition members and the cores therein, the cover plate being provided with a connecting part for the total module positive electrode and a connecting part for the total module negative electrode,
    wherein a screw hole is provided in the connecting sheet between the positive tab and the negative tab of the core, a corresponding screw hole is provided in the cover plate, and the cover plate is fixed with the connecting sheet between the positive tab and the negative tab of the core by a bolt.

11. A lithium-ion battery, wherein the lithium-ion battery comprises a lithium-ion battery module comprising:
    a plurality of cores, each core being a winded core, a laminated core or a pouch battery, one end of each core being provided with a positive tab and a negative tab respectively, the plurality of cores being connected in series and/or in parallel by using the positive tabs and the negative tabs through connecting sheets, and the positive tabs and the negative tabs forming a total module positive electrode and a total module negative electrode;
    a plurality of partition members, each partition member being used for accommodating a single core and physically separating the respective cores, and the partition member having a top opened structure; and
    a housing and a cover plate, configured to be assembled to form an inner space for accommodating the plurality of partition members and the cores therein, and the cover plate being provided with a connecting part for the total module positive electrode and a connecting part for the total module negative electrode, wherein a screw hole is provided in the connecting sheet between the positive tab and the negative tab of the core, a corresponding screw hole is provided in the cover plate, and the cover plate is fixed with the connecting sheet between the positive tab and the negative tab of the core by a bolt.

12. The lithium-ion battery according to claim 11, wherein the partition member is an individual housing, a partition membrane or a partition plate.

13. The lithium-ion battery according to claim 11, wherein the lithium-ion battery module has 2 to 10 cores.

14. The lithium-ion battery according to claim 11, further comprising a top cover that covers the cover plate and is provided with an outlet for the total module positive electrode and an outlet for the total module negative electrode.

15. The lithium-ion battery according to claim 11, wherein a seal is formed between the cover plate and the opened structure of each partition member, and the cover plate is provided with liquid injection holes for injecting liquid into the partition member.

16. The lithium-ion battery according to claim 15, wherein the number of the liquid injection holes is the same as the number of the cores.

17. The lithium-ion battery according to claim 11, wherein the cover plate has a plurality of connection holes for connecting external signal lines.

18. The lithium-ion battery according to claim 11, further comprising a heating sheet or a liquid cooling plate.

19. The lithium-ion battery module according to claim 1, wherein the plurality of partition members are integrally molded with the housing.

20. The lithium-ion battery module according to claim 1, wherein the cover plate is integrally injection-molded with the connecting sheets.

\* \* \* \* \*